(12) United States Patent
Wang

(10) Patent No.: US 11,923,863 B2
(45) Date of Patent: Mar. 5, 2024

(54) FPGA-BASED DESIGN METHOD AND DEVICE FOR EQUALLY DIVIDING INTERVAL

(71) Applicant: INSPUR SUZHOU INTELLIGENT TECHNOLOGY CO., LTD., Jiangsu (CN)

(72) Inventor: Xiankun Wang, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 181 days.

(21) Appl. No.: 17/778,473

(22) PCT Filed: Aug. 26, 2020

(86) PCT No.: PCT/CN2020/111357
§ 371 (c)(1),
(2) Date: May 20, 2022

(87) PCT Pub. No.: WO2021/135303
PCT Pub. Date: Jul. 8, 2021

(65) Prior Publication Data
US 2022/0416797 A1    Dec. 29, 2022

(30) Foreign Application Priority Data
Dec. 31, 2019 (CN) .......... 201911421769.X

(51) Int. Cl.
*G06F 15/173* (2006.01)
*G06F 30/34* (2020.01)
(Continued)

(52) U.S. Cl.
CPC .............. *H03L 7/191* (2013.01); *G06F 30/34* (2020.01); *H03K 19/17708* (2013.01)

(58) Field of Classification Search
CPC .... G06F 30/34; H03K 19/17708; H03L 7/191
See application file for complete search history.

(56) References Cited

U.S. PATENT DOCUMENTS 6,762,714 B2* 7/2004 Cohen ..................... G01S 19/37
                                                      342/357.29
8,037,335 B2* 10/2011 Kim ...................... H04J 3/0685
                                                      713/400
(Continued)

FOREIGN PATENT DOCUMENTS

| CN | 103941622 A | 7/2014 |
| CN | 108599758 A | 9/2018 |

(Continued)

OTHER PUBLICATIONS

International Search Report cited in PCT application No. PCT/CN2020/111357, dated Nov. 27, 2020, 5 pages.
(Continued)

*Primary Examiner* — Kurtis R Bahr
(74) *Attorney, Agent, or Firm* — Cooper Legal Group LLC

(57) ABSTRACT

Provided is a FPGA-based design method for equally dividing an interval, including the following steps: dividing the oscillation periods of a second pulse signal of a crystal oscillator clock of a FPGA board by the number of equally divided sampling pulses, and obtaining the remainder thereof; dividing the remainder by the number of the equally divided sampling pulses to serve as an error within each sampling interval; using a counter to count from the second pulse, and stopping the counting of the counter once whenever the error within the sampling interval, which is accumulated within the second pulse interval, is greater than or equal to the vibration period. Further provided is a FPGA-based design device for equally dividing an interval. The
(Continued)

present application makes full use of the feature of interval equal division calculation, has high precision, and is easy to implement.

15 Claims, 2 Drawing Sheets

(51) Int. Cl.
*H03K 19/17704* (2020.01)
*H03L 7/191* (2006.01)

(56) References Cited

U.S. PATENT DOCUMENTS

| | | | | |
|---|---|---|---|---|
| 8,150,055 | B2* | 4/2012 | Sakamoto | G10K 11/17854 381/71.4 |
| 10,171,326 | B2* | 1/2019 | Kolotov | H04J 3/14 |
| 11,237,275 | B2* | 2/2022 | Sato | G01S 19/071 |
| 11,609,323 | B2* | 3/2023 | Cai | H04L 7/0008 |
| 2019/0140647 | A1* | 5/2019 | Lim | H03K 19/17704 |

FOREIGN PATENT DOCUMENTS

| | | |
|---|---|---|
| CN | 109283864 A | 1/2019 |
| CN | 109597297 A | 4/2019 |
| CN | 109617528 A | 4/2019 |
| CN | 109814835 A | 5/2019 |
| CN | 111211779 A | 5/2020 |

OTHER PUBLICATIONS

Written Opinion cited in PCT application No. PCT/CN2020/111357, dated Nov. 27, 2020, 10 pages.
Corresponding Chinese Patent Application No. CN201911421769.X, Notification of Patent Grant, dated Oct. 10, 2022.

* cited by examiner

FPGA-BASED DESIGN METHOD AND DEVICE FOR EQUALLY DIVIDING INTERVAL

The present application claims priority to Chinese Patent Application No. 201911421769.X, entitled "FPGA-Based Design Method and Device for Equally Dividing Interval", filed to China Patent Office on Dec. 31, 2019, the entire contents of which are incorporated herein by reference.

FIELD

The present application relates to the field of computers and, more particularly, to a Field Programmable Gate Array (FPGA)-based design method and device for equally dividing an interval.

BACKGROUND

In the fields of measurement and control, communication, etc., the synchronization of time and data is highly required within or between equipment(s). The synchronous collection and information exchange of time and data is often based on GPS or Beidou time information, such as parsed second pulse information. However, a second interval is too large. It is often necessary to divide the second interval into N equal parts, and the second interval is required to be updated with the second pulse in real time, thereby ensuring the stability and accuracy of interval equal division. An interval equal division algorithm is thus generated.

At present, implementations of an interval equal division function mostly depend on the precision of a crystal oscillator and corresponding correction methods. Some implementations are too complicated, while it is difficult for some other implementations to ensure precision requirements.

SUMMARY

In view of this, an object of examples of the present application is to provide an interval equal division algorithm and implementations, which have high precision and are easy to implement.

Based on the above object, an aspect of examples of the present application provides a FPGA-based design method for equally dividing an interval, including the following steps:

dividing an oscillation periods of a second pulse signal of a crystal oscillator clock of a FPGA board by a number of equally divided sampling pulses, and obtaining a remainder thereof;

dividing the remainder by the number of the equally divided sampling pulses to serve as an error within each sampling interval;

using a counter to count from the second pulse, and stopping counting of the counter once whenever the error within the sampling interval, which is accumulated within a second pulse interval, is greater than or equal to the oscillation period.

In some embodiments, the step of dividing the oscillation periods of a second pulse signal of a crystal oscillator clock of a FPGA board by the number of equally divided sampling pulses and obtaining the remainder thereof includes:

dividing the oscillation periods of a second pulse of a crystal oscillator clock of a FPGA board by the number of equally divided sampling pulses to obtain a quotient thereof;

generating a sampling pulse within each second pulse interval in response to a value of the counter reaching the quotient, while the counter is reset and restarts counting.

In some embodiments, the method further includes:
performing correction according to a correction formula $$\text{Bias} = n \times \frac{R}{N} - m,$$

and stopping counting of the counter once within each second pulse interval whenever a value of Bias is greater than or equal to 1, wherein $$\frac{R}{N}$$

represents an error within each sampling interval, R is the obtained remainder, and N is the number of the equally divided sampling pulses;

n represents a number of sampling pulses, and is reset at a next second pulse;

m represents a number of counting stops of the counter within each second pulse interval, a starting value of m is 0, and the value of m is reset at a next second pulse.

In some embodiments, the method further includes:
performing correction according to a correction formula $$\text{Bias} - n \times \frac{R}{N} - m + \frac{1}{2},$$

and stopping counting of the counter once within each second pulse interval whenever the value of Bias is greater than or equal to 1.

In some embodiments, the method further includes:
performing correction according to a correction formula $$\text{Bias}' = n \times \frac{R}{N} - (m+1) + \frac{1}{2} = n \times \frac{R}{N} - k + \frac{1}{2},$$

and stopping counting of the counter once while incrementing a value of k by 1 within each second pulse interval whenever a value of Bias' is greater than or equal to 0.

Another aspect of examples of the present application provides a FPGA-based design device for equally dividing an interval, including:

one or more processor; and a memory storing computer-readable instructions executable on the one or more processor, the instructions, when executed by the one or more processor, implementing the following steps:

dividing the oscillation periods of a second pulse signal of a crystal oscillator clock of a FPGA board by the number of equally divided sampling pulses, and obtaining the remainder thereof;

dividing the remainder by the number of the equally divided sampling pulses to serve as an error within each sampling interval;

using a counter to count from the second pulse, and stopping counting of the counter once whenever the error within the sampling interval, which is accumulated within the second pulse interval, is greater than or equal to the oscillation period.

In some embodiments, the step of dividing the oscillation periods of a second pulse signal of a crystal oscillator clock of a FPGA board by the number of equally divided sampling pulses and obtaining the remainder thereof includes:

dividing the oscillation periods of a second pulse of a crystal oscillator clock of a FPGA board by the number of equally divided sampling pulses to obtain the quotient thereof;

generating a sampling pulse within each second pulse interval in response to the value of the counter reaching the quotient, while the counter is reset and restarts counting.

In some embodiments, the steps further include:

performing correction according to a correction formula $$\text{Bias} = n \times \frac{R}{N} - m,$$

and stopping counting of the counter once within each second pulse interval whenever the value of Bias is greater than or equal to 1, wherein $\frac{R}{N}$ represents an error within each sampling interval, R is the obtained remainder, and N is the number of the equally divided sampling pulses;
n represents the number of sampling pulses, and is reset at a next second pulse;
m represents the number of counting stops of the counter within each second pulse interval, a starting value of m is 0, and the value of m is reset at a next second pulse.

In some embodiments, the steps further include:

performing correction according to a correction formula $$\text{Bias} = n \times \frac{R}{N} - m + \frac{1}{2},$$

and stopping counting of the counter once within each second pulse interval whenever the value of Bias is greater than or equal to 1.

In some embodiments, the steps further include:

performing correction according to a correction formula $$\text{Bias}' = n \times \frac{R}{N} - (m+1) + \frac{1}{2} = n \times \frac{R}{N} - k + \frac{1}{2},$$

where the counting of the counter is stopped once while incrementing the value of k by 1 within each second pulse interval whenever Bias' is greater than or equal to a correction value of 0.

The present application has the following advantageous technical effects. The FPGA-based design method and device for equally dividing an interval provided by examples of the present application can ensure that the equal division precision is within±0.5 clock periods, and the present application has high precision and is easy to implement. Moreover, the implementation device has a simple interface and strong reusability, and can be widely used in related products such as measurement and control, communication, and data processing centers with requirements for synchronization and precision.

BRIEF DESCRIPTION OF THE DRAWINGS

In order to more clearly illustrate the technical solutions in examples of the present application or the prior art, the drawings needing to be used in the description of the examples or the prior art will be briefly introduced below. It is obvious that the drawings in the following description are merely some examples of the present application. A person ordinarily skilled in the art may also obtain other embodiments according to these drawings without making any inventive effort.

DETAILED DESCRIPTION

Examples of the present application are described below. However, it should be understood that the disclosed examples are merely exemplary and that other examples may take various alternative forms. The drawings are not necessarily to scale. Certain functions may be exaggerated or minimized to show details of particular components.

Therefore, specific structural and functional details disclosed herein are not to be interpreted as limiting, but merely as a representative basis for teaching a person skilled in the art to variously employ the present application. As will be appreciated by a person ordinarily skilled in the art, various features shown and described with reference to any one of the drawings may be combined with features shown in one or more of the other drawings to produce examples that are not explicitly shown or described. The combination of features shown provides a representative example for a typical application. However, various combinations and modifications of features consistent with the teachings of the present application may be desirable for certain specific applications or embodiments.

In order to make the objects, technical solutions and advantages of the present application clearer, examples of the present application will be further described in detail below with reference to specific examples and the accompanying drawings.

While the present application has been described with reference to equal-interval sampling pulses equally divided in real time with second intervals as commonly used in measurement and control systems, it should be understood, of course, that the present application is not limited thereto.

A second interval is equally divided into N equal parts by taking a second pulse signal as an interval boundary to be equally divided, and the precision of equal division is ensured. If a counter (X) counts the oscillation periods S of the second pulse of a crystal oscillator clock of a FPGA board, S may be divided by N to form N sampling pulses by equal division. Then:

$$S = N \times Q + R \qquad \text{Formula (1)}$$

wherein Q is the quotient of S divided by N, and R is the remainder of S divided by N.

If the period of a crystal oscillator is also counted by the counter (Y), a sampling pulse is generated within each second interval when the counter value is Q, and meanwhile, the counter is reset and continues counting, and so on. Then N sampling pulses will be generated within one second. Meanwhile, an error is accumulated as R clock periods. In fact, S is divided by N to obtain each period interval $$Q + \frac{R}{N} \cdot \frac{R}{N}$$

is a value less than one clock period. If Q serves as a sampling count interval, the precision of each of the equally divided intervals actually biases by $$\frac{R}{N}$$

periods, and the error is gradually increased by gradual accumulation. In order to ensure the precision of interval equal division, the above error may be counted and corrected instantly.

Figure 1:
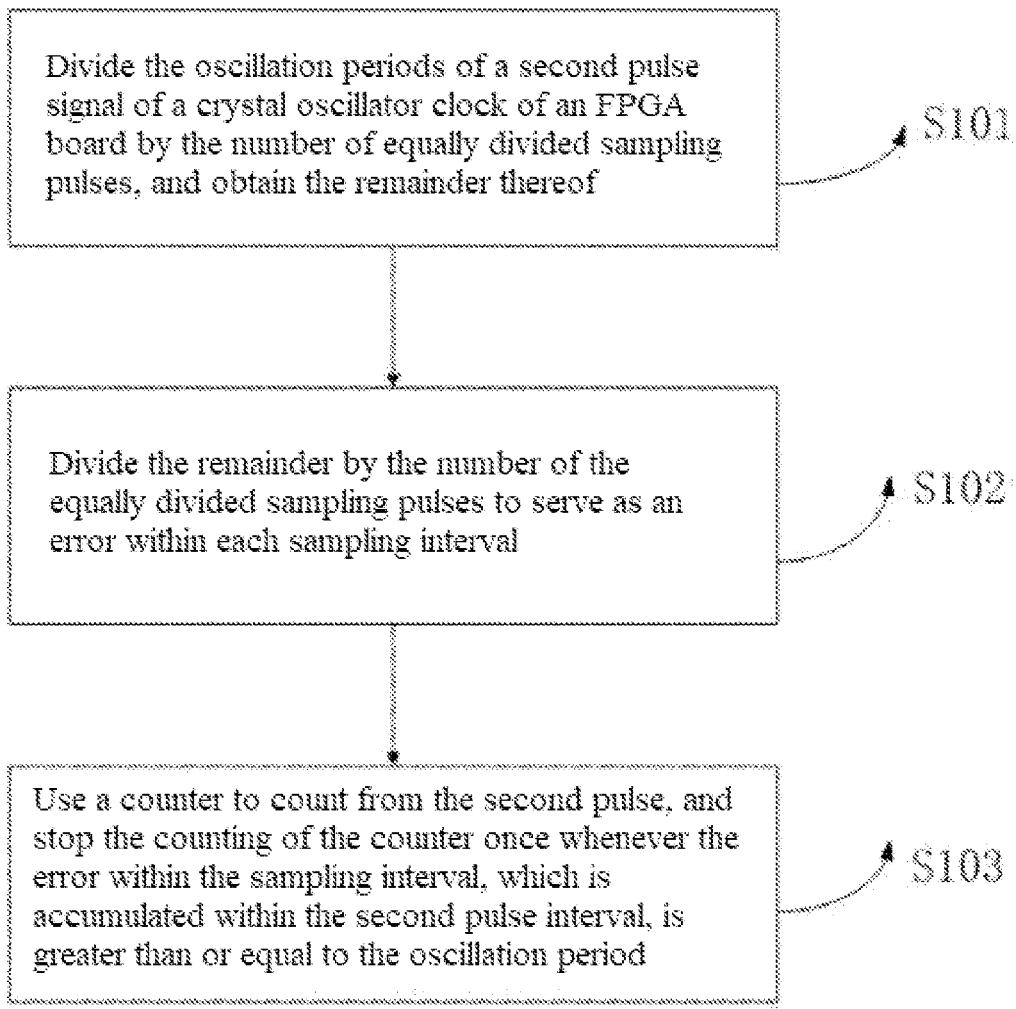
FIG. 1 is a flowchart of a FPGA-based design method for equally dividing an interval according to the present application.

Based on the above object, an aspect of examples of the present application provides a FPGA-based design method for equally dividing an interval. As shown in FIG. 1, the method includes the following steps.

In step S101, the oscillation periods of a second pulse signal of a crystal oscillator clock of a FPGA board is divided by the number of equally divided sampling pulses, and the remainder thereof is obtained.

In step S102, the remainder is divided by the number of the equally divided sampling pulses to serve as an error within each sampling interval.

In step S103, a counter is used to count from the second pulse, and the counting of the counter is stopped once whenever the error within the sampling interval, which is accumulated within the second pulse interval, is greater than or equal to the oscillation period.

Figure 2:
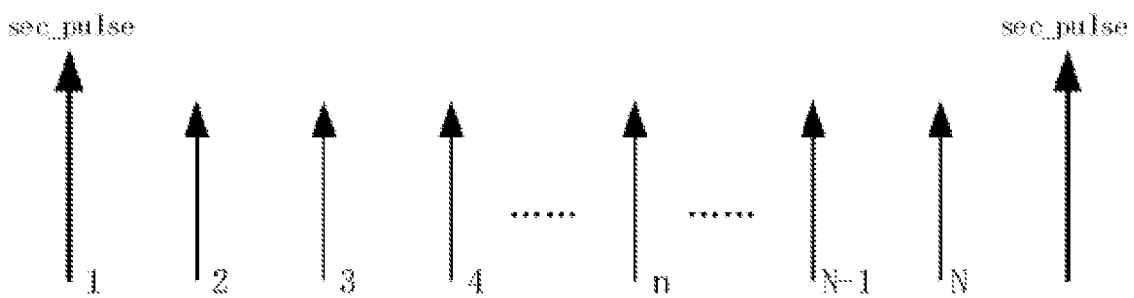
FIG. 2 is a schematic diagram of a sampling pulse equally divided from a second interval according to the method of the present application.

In some examples, the step of dividing the oscillation periods of a second pulse signal of a crystal oscillator clock of a FPGA board by the number of equally divided sampling pulses and obtaining the remainder thereof includes: dividing the oscillation periods of a second pulse of a crystal oscillator clock of a FPGA board by the number of equally divided sampling pulses to obtain the quotient thereof; generating a sampling pulse within each second pulse interval in response to the value of the counter reaching the quotient, while the counter is reset and restarts counting. It is assumed that the sampling pulses (sampling intervals) equally divided within the second interval are numbered as 1, 2, 3, ..., N, as shown in FIG. 2.

In some examples, the method further includes the following steps. Correction is performed according to a correction formula:

$$\text{Bias} = n \times \frac{R}{N} - m. \qquad \text{Formula (2)}$$

The counting of the counter is stopped once within each second pulse interval whenever the value of Bias is greater than or equal to 1.

$$\frac{R}{N}$$

represents an error within each sampling interval, R is the obtained remainder, and N is the number of the equally divided sampling pulses. n represents the number of sampling pulses, and is reset at a next second pulse. m represents the number of counting stops of the counter within each second pulse interval, a starting value of m is 0, and the value of m is reset at a next second pulse.

In order to correct the error instantly, if the error $$\frac{R}{N}$$

within each sampling interval is counted, the counting of an interval counter (Y) is stopped for one period whenever the error is greater than or equal to one clock period. Equivalently, the error is corrected instantly for one period whenever the error is accumulated for one clock period, and so on. m is the number of counts of the counter (Y) is stopped during error correction from a second pulse. A starting value is 0, m is incremented by 1 whenever counting is stopped once, and the value is reset at a next second pulse. It can be seen therefrom that as the sampling pulse n is increased, the counting of the counter (Y) is stopped once whenever the value of Bias is greater than or equal to 1, the error of interval equal division may be corrected instantly, and the precision (error accumulation) of interval equal division does not exceed one clock period.

In some examples, the method further includes the following steps. Correction is performed according to a correction formula:

$$\text{Bias} = n \times \frac{R}{N} - m + \frac{1}{2}. \qquad \text{Formula (3)}$$

The counting of the counter is stopped once within each second pulse interval whenever the value of Bias is greater than or equal to 1. Since the instant correction of the error is ex post, the precision of equal division at this moment is within −1 to 0 clock periods. Then the correction formula is corrected from (2) to (3). Also whenever Bias is greater than or equal to 1, one clock period is corrected. Since 0.5 periods are pre-increased, the precision of equal division may be corrected to be within ±0.5 clock periods by means of this correction, and the precision is higher.

In some examples, the method further includes the following steps. Correction is performed according to a correction formula:

$$\text{Bias}' = n \times \frac{R}{N} - (m+1) + \frac{1}{2} = n \times \frac{R}{N} - k + \frac{1}{2}. \qquad \text{Formula (4)}$$

The counting of the counter is stopped once while incrementing the value of k by 1 within each second pulse interval whenever the value of Bias' is greater than or equal to 0. In order to facilitate the implementation of FPGA, the value of Bias in Formula (3) is reduced by 1 to form Formula (4). According to the above method, an error correction manner of interval equal division is changed at this moment into: stopping counting of the counter (Y) for one clock and incrementing the value of k by 1 whenever Bias' is greater than or equal to 0. In addition, an initial value of k is changed into 1 at the second pulse. At this moment, it is ensured that the precision of each of the equally divided intervals is not greater than 0.5 clock periods.

In some examples, during specific implementation, Formula (4) is transformed into:

$$\text{Bias}''=n*2R-2k*N+N\geq 0 \quad \text{Formula (5)}$$

At the beginning of the second interval, n is 1 and k is 1. Therefore, Bias"=2R−N. It is determined that the counting of the counter (Y) is stopped once if Bias"≤0; otherwise, no operation is performed. Thereafter, whenever a next equally divided interval comes, i.e. the counter (Y) counts to the value of Q to generate a sampling pulse, is reset, and counts again. At this moment, the value of n is incremented by 1. Bias"=Bias"+2R. Then it is determined that the counting of the counter (Y) is stopped once if Bias"≥0 (at this moment, the value of k is incremented by 1), while Bias'=Bias'−2N; otherwise, no operation is performed, and so on. The method is convenient and facilitates the implementation of FPGA.

Where technically feasible, the technical features enumerated above for different examples may be combined with each other, or changed, added, omitted, etc. to form further examples within the scope of the present application.

It can be seen from the above examples that the interval equal division algorithm provided by the examples of the present application makes full use of the feature of interval equal division calculation, which is equivalent to counting an equal division bias of each clock period in real time and correcting instantly whenever the minimum timing unit of one clock period is reached. It can be ensured that the precision of equal division is within ±0.5 clock periods, and the present application has high precision and is easy to implement. The device may be encapsulated into an IP module with simple interface and strong reusability.

Based on the above object, another aspect of examples of the present application provides a FPGA-based design device for equally dividing an interval, including:
one or more processor; and
a memory storing computer-readable instructions executable on the one or more processor, the instructions, when executed by the one or more processor, implementing the following steps:
dividing the oscillation periods of a second pulse signal of a crystal oscillator clock of a FPGA board by the number of equally divided sampling pulses, and obtaining the remainder thereof;
dividing the remainder by the number of the equally divided sampling pulses to serve as an error within each sampling interval;
using a counter to count from the second pulse, and stopping counting of the counter once whenever the error within the sampling interval, which is accumulated within the second pulse interval, is greater than or equal to the oscillation period.

In some embodiments, the step of dividing the oscillation periods of a second pulse signal of a crystal oscillator clock of a FPGA board by the number of equally divided sampling pulses and obtaining the remainder thereof includes:
dividing the oscillation periods of a second pulse of a crystal oscillator clock of a FPGA board by the number of equally divided sampling pulses to obtain the quotient thereof;

generating a sampling pulse within each second pulse interval in response to the value of the counter reaching the quotient, while the counter is reset and restarts counting.

In some embodiments, the steps further include:
performing correction according to a correction formula $$\text{Bias} = n \times \frac{R}{N} - m,$$

and stopping counting of the counter once within each second pulse interval whenever the value of Bias is greater than or equal to 1, wherein $$\frac{R}{N}$$

represents an error within each sampling interval, R is the obtained remainder, and N is the number of the equally divided sampling pulses;
n represents the number of sampling pulses, and is reset at a next second pulse;
m represents the number of counting stops of the counter within each second pulse interval, a starting value of m is 0, and the value of m is reset at a next second pulse.

In some embodiments, the steps further include:
performing correction according to a correction formula $$\text{Bias} = n \times \frac{R}{N} - m + \frac{1}{2},$$

and stopping counting of the counter once within each second pulse interval whenever the value of Bias is greater than or equal to 1.

In some embodiments, the steps further include:
performing correction according to a correction formula $$\text{Bias}' = n \times \frac{R}{N}(m\mid 1) \mid \frac{1}{2} = n \times \frac{R}{N}k \mid \frac{1}{2},$$

where the counting of the counter is stopped once while incrementing the value of k by 1 within each second pulse interval whenever Bias' is greater than or equal to a correction value of 0.

In an example of the present application, a FPGA may include a second interval counting module, an equal division calculation module, a bias correction module, and an equally divided interval counting module.

The second interval counting module counts the oscillation periods of a second pulse signal input in real time, and inputs the oscillation periods to the equal division calculation module.

The equal division calculation module receives the oscillation periods and a configured number of sampling pulses, and divides the oscillation periods by the configured number of sampling pulses to obtain the quotient and remainder thereof.

The bias correction module corrects a bias of equally divided intervals according to the remainder.

The equally divided interval counting module cyclically counts a counter to output equally divided interval pulses according to the quotient and the bias correction of the bias correction module.

Figure 3:
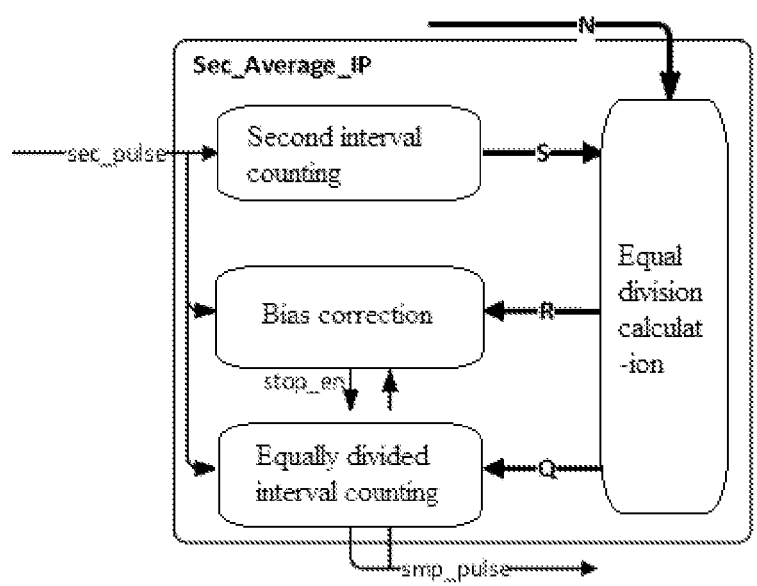
FIG. 3 is a schematic architecture diagram of a FPGA-based design device for equally dividing an interval according to the present application.

As shown in the schematic diagram of a FPGA implementation architecture in FIG. 3, the second interval counting module counts an interval value S of the second pulse signal input in real time. The equal division calculation module obtains values S and configured number N, and calculates and outputs values Q and R. The bias correction module instantly corrects the bias of equally divided intervals according to the above equal division correction process. The equally divided interval counting module cyclically counts the value Q according to bias correction, and outputs high-precision equally divided interval pulses.

In some examples, the bias correction module is configured to:

perform bias correction according to a correction formula, wherein a correction pulse is output to the equally divided interval counting module within each second pulse interval in response to the resulted value of the correction formula being greater than or equal to a correction value;

receive a correction result of the equally divided interval counting module.

In some examples, the equally divided interval counting module is configured to:

stop counting of the counter once in response to receiving the correction pulse, and take the number of counting stops of the counter as a correction result to be sent to the bias correction module.

In some examples, the bias correction module is configured to:

perform correction according to a correction formula $$\text{Bias} = n \times \frac{R}{N} - m,$$

output a correction pulse to the equally divided interval counting module within each second pulse interval whenever the value of Bias is greater than or equal to a correction value of 1, and increment the value of m by 1 according to a correction result, wherein $$\frac{R}{N}$$

represents an error within each sampling interval, R is the obtained remainder, and N is the number of the equally divided sampling pulses;

n represents the number of sampling pulses, and is reset at a next second pulse;

m represents the number of counting stops of the counter within each second pulse interval, a starting value of m is 0, and the value of m is reset at a next second pulse.

In some examples, the bias correction module is configured to:

perform correction according to a correction formula $$\text{Bias}' = n \times \frac{R}{N} - (m+1) + \frac{1}{2} = n \times \frac{R}{N} - k + \frac{1}{2},$$

wherein a correction pulse is output to the equally divided interval counting module within each second pulse interval whenever Bias' is greater than or equal to a correction value 0, and increment the value of k by 1 according to a correction result. In addition, an initial value of k is changed into 1 at the second pulse. At this moment, it is ensured that the precision of each of the equally divided intervals is not greater than 0.5 clock periods.

In some examples, during specific implementation, the formula is transformed into:

$$\text{Bias}''=n*2R-2k*+N\geq 0$$

At the beginning of the second interval, n is 1 and k is 1. Therefore, Bias"=2R−N. It is determined that the counting of the counter (Y) is stopped once if Bias">0; otherwise, no operation is performed. Thereafter, whenever a new equally divided interval comes, i.e. the counter (Y) counts to the value Q to generate a sampling pulse, is reset, and counts again. At this moment, the value n is incremented by 1. Bias"=Bias"+2R. Then it is determined that the counting of the counter (Y) is stopped once if Bias"≥0 (at this moment, the value k is incremented by 1), while Bias"=Bias"−2N; otherwise, no operation is performed, and so on. Thus, the implementation of FPGA is facilitated.

Any of the examples of computer device that performs the FPGA-based design method for equally dividing an interval may achieve the same or similar effects as any of the previously described method examples corresponding thereto.

Finally, it will be appreciated by a person ordinarily skilled in the art that implementing all or part of the processes in the above exemplary methods may be completed by a computer program that instructs associated hardware. The program may be stored in a computer-readable memory medium. When executed, the program may include processes of the above method examples. The memory medium may be a magnetic disk, an optical disk, a read-only memory (ROM), or a random access memory (RAM), etc.

In addition, the devices, equipment, etc. disclosed in the examples of the present application may typically be various electronic terminal device, such as mobile phones, personal digital assistants (PDA), tablets (PADs), and smart televisions, or may be large terminal devices, such as servers. Therefore, the scope of protection disclosed in the examples of the present application should not be limited to a particular type of devices, equipment, etc. The client disclosed in the examples of the present application may be applied to any of the electronic terminal device described above in the form of electronic hardware, computer software, or a combination of both.

In addition, the method disclosed according to the examples of the present application may also be implemented as a computer program executed by a CPU. The computer program may be stored in a computer-readable memory medium. When the computer program is executed by the CPU, the above functions defined in the method disclosed in the examples of the present application are performed.

In addition, the above method steps and system units may also be implemented using a controller and a computer-readable memory medium for storing a computer program for causing the controller to perform the functions of the above steps or units.

In addition, it should be appreciated that the computer-readable memory medium (e.g. memory) described herein may be either a volatile memory or a non-volatile memory, or may include both a volatile memory and a non-volatile memory. By way of example and not limitation, the non-volatile memory may include a ROM, a programmable ROM (PROM), an electrically programmable ROM (EPROM), an electrically erasable programmable ROM (EEPROM), or a flash memory. The volatile memory may include a RAM, which may serve as an external cache. By way of example and not limitation, the RAM may be available in many forms such as a synchronous RAM (DRAM), a dynamic RAM (DRAM), a synchronous DRAM (SDRAM), a dual data rate SDRAM (DDR SDRAM), an enhanced SDRAM (ESDRAM), a synchronous link DRAM (SLDRAM), and a direct Rambus RAM (DRRAM). The memory device the disclosed aspects is intended to include, but not limited to, these and other suitable types of memory.

Those skilled in the art would also appreciate that the various exemplary logical blocks, modules, circuits, and algorithm steps described in connection with the disclosure herein may be implemented as electronic hardware, computer software, or a combination of both. In order to clearly illustrate this interchangeability of hardware and software, various exemplary components, blocks, modules, circuits, and steps have been described generally in terms of their functionality. Whether such functionality is implemented as software or hardware depends upon specific applications and design constraints imposed on the entire system. Those skilled in the art may implement the described functionality in various ways for each specific application, but such implementation decisions should not be interpreted as a departure from the scope of disclosure of the examples of the present application.

The various exemplary logical blocks, modules, and circuits described in connection with the disclosure herein may be implemented or performed with the following components designed to perform the functionality described herein: a general purpose processor, a digital signal processor (DSP), an application specific integrated circuit (ASIC), a field programmable gate array (FPGA), or other programmable logic devices, discrete gates or transistor logics, discrete hardware components, or any combination thereof. The general purpose processor may be a microprocessor, but alternatively, the processor may be any conventional processor, controller, microcontroller, or state machine. The processor may also be implemented as a combination of computing equipment, e.g. a combination of a DSP and a microprocessor, a plurality of microprocessors, one or more microprocessors in conjunction with a DSP, and/or any other such configuration.

The steps of the method or algorithm described in connection with the disclosure herein may be contained directly in hardware, in a software module executed by a processor, or in a combination of both. The software module may reside in a RAM, a flash memory, a ROM, an EPROM, an EEPROM, a register, a hard disk, a removable disk, a CD-ROM, or any other form of memory medium known in the art. An exemplary storage medium is coupled to the processor such that the processor can access information from the memory medium or write information to the storage medium. In an alternative, the memory medium may be integrated to the processor. The processor and the memory medium may reside in an ASIC. The ASIC may reside in a user terminal. In an alternative, the processor and the memory medium may reside, as discrete components, in the user terminal.

In one or more exemplary designs, the functionality may be implemented in hardware, software, firmware, or any combination thereof. If implemented in software, the functionality may be stored in or transmitted over a computer-readable medium, as one or more instructions or codes. The computer-readable medium includes a computer memory medium and a communication medium. The communication medium includes any medium that facilitates transmission of a computer program from one position to another position. The memory medium may be any available medium that can be accessed by a general purpose or special purpose computer. By way of example and not limitation, the computer-readable medium may include a RAM, a ROM, an EEPROM, a CD-ROM, or other optical disk memory device, magnetic disk storage or other magnetic memory device, or any other medium that may be used to carry or store desired program code in the form of instructions or data structures and that can be accessed by a general purpose or special purpose computer or a general purpose or special purpose processor. In addition, any connection may be properly referred to a computer-readable medium. For example, if software is transmitted from a website, a server, or other remote sources using a coaxial cable, a fiber optic cable, a twisted pair, a digital subscriber line (DSL), or wireless technologies such as infrared, radio, and microwave, the above coaxial cable, fiber optic cable, twisted pair, DSL, or wireless technologies such as infrared, radio, and microwave are included in the definition of a medium. The magnetic disk and the optical disk, as used herein, include a compact disk (CD), a laser disk, an optical disk, a digital video disk (DVD), a floppy disk, and a blue-ray disk. The magnetic disk usually reproduces data magnetically, while the optical disk reproduces data optically with lasers. Combinations of the above should also be included within the scope of the computer-readable medium.

It will be understood that, as used herein, the singular forms "a/an" are intended to include the plural forms as well, unless the context clearly supports the exception. It should also be understood that "and/or" as used herein is meant to include any and all possible combinations of one or more of the associated listed items.

The serial numbers of the above examples of the present application have been disclosed for the purpose of illustration only, and are not intended to represent the advantages and disadvantages of the examples.

Those ordinarily skilled in the art will appreciate that all or part of the steps for implementing the above examples may be completed by hardware or by a program that instructs the associated hardware. The program may be stored in a computer-readable memory medium. The above-mentioned memory medium may be a ROM, a magnetic disk, or an optical disk, etc.

The above examples are possible examples of embodiments, and are presented only for a clear understanding of the principles of the present application. Those ordinarily skilled in the art will appreciate that the above discussion of any examples is intended to be exemplary only, and is not intended to suggest that the scope of disclosure of the examples of the present application (including the claims) is limited to these examples. Combinations of technical features in the above examples or in different examples are also possible under the idea of the examples of the present application, and many other variations of different aspects of the examples of the present application as described above are possible, which are not provided in detail for the sake of clarity. Accordingly, any omissions, modifications, equivalent replacements, improvements and the like made within the spirit and principles of the examples of the present application should be included within the scope of protection of the examples of the present application.

What is claimed is:

1. A Field Programmable Gate Array (FPGA)-based design method for equally dividing an interval, comprising the following steps:

dividing oscillation periods of a second pulse signal of a crystal oscillator clock of a FPGA board by a number of equally divided sampling pulses and obtaining a remainder thereof;

dividing the remainder by the number of the equally divided sampling pulses to serve as an error within each sampling interval; and using a counter to count from the second pulse signal and stopping counting of the counter whenever the error within the sampling interval, which is accumulated within a second pulse interval, is greater than or equal to the oscillation period.

2. The method according to claim 1, wherein the step of dividing the oscillation periods of the second pulse signal of the crystal oscillator clock of the FPGA board by the number of the equally divided sampling pulses and obtaining the remainder thereof comprises:

dividing the oscillation periods of the second pulse signal of the crystal oscillator clock of the FPGA board by the number of the equally divided sampling pulses to obtain a quotient thereof; and generating a sampling pulse within each second pulse interval in response to a value of the counter reaching the quotient while the counter is reset and restarts counting.

3. The method according to claim 2, further comprising: performing correction according to a correction formula $$\text{Bias} = n \times \frac{R}{N} - m,$$

and stopping counting of the counter within each second pulse interval whenever a value of Bias is greater than or equal to 1, wherein:

$$\frac{R}{N}$$

represents an error within each sampling interval, R is the remainder, and N is the number of the equally divided sampling pulses;

n represents a number of sampling pulses and is reset at a next second pulse; and m represents a number of counting stops of the counter within each second pulse interval, a starting value of m is 0, and a value of m is reset at a next second pulse.

4. The method according to claim 3, further comprising: performing correction according to a second correction formula $$\text{Bias} = n \times \frac{R}{N} - m + \frac{1}{2},$$

and stopping counting of the counter within each second pulse interval whenever the value of Bias is greater than or equal to 1.

5. The method according to claim 4, further comprising: performing correction according to a third correction formula $$\text{Bias}' = n \times \frac{R}{N} - (m+1) + \frac{1}{2} = n \times \frac{R}{N} - k + \frac{1}{2},$$

and stopping counting of the counter while incrementing a value of k by 1 within each second pulse interval whenever a value of Bias' is greater than or equal to 0.

6. A Field Programmable Gate Array (FPGA)-based design device for equally dividing an interval, comprising:

one or more processor; and a memory storing computer-readable instructions executable on the one or more processor, the computer-readable instructions, when executed by the one or more processor, implementing the following steps:

dividing oscillation periods of a second pulse signal of a crystal oscillator clock of a FPGA board by a number of equally divided sampling pulses and obtaining a remainder thereof;

dividing the remainder by the number of the equally divided sampling pulses to serve as an error within each sampling interval; and using a counter to count from the second pulse signal and stopping counting of the counter whenever the error within the sampling interval, which is accumulated within a second pulse interval, is greater than or equal to the oscillation period.

7. The device according to claim 6, wherein the step of dividing the oscillation periods of the second pulse signal of the crystal oscillator clock of the FPGA board by the number of the equally divided sampling pulses and obtaining the remainder thereof comprises:

dividing the oscillation periods of the second pulse signal of the crystal oscillator clock of the FPGA board by the number of the equally divided sampling pulses to obtain a quotient thereof; and generating a sampling pulse within each second pulse interval in response to a value of the counter reaching the quotient while the counter is reset and restarts counting.

8. The device according to claim 7, wherein the steps further comprise:

performing correction according to a correction formula $$\text{Bias} = n \times \frac{R}{N} - m,$$

and stopping counting of the counter within each second pulse interval whenever a value of Bias is greater than or equal to 1, wherein:

$$\frac{R}{N}$$

represents an error within each sampling interval, R is the remainder, and N is the number of the equally divided sampling pulses;

n represents a number of sampling pulses and is reset at a next second pulse; and m represents a number of counting stops of the counter within each second pulse interval, a starting value of m is 0, and a value of m is reset at a next second pulse.

9. The device according to claim 8, wherein the steps further comprise:

performing correction according to a second correction formula $$\text{Bias} = n \times \frac{R}{N} - m + \frac{1}{2},$$

and stopping counting of the counter within each second pulse interval whenever the value of Bias is greater than or equal to 1.

10. The device according to claim 9, wherein the steps further comprise:
performing correction according to a third correction formula $$\text{Bias}' = n \times \frac{R}{N} - (m+1) + \frac{1}{2} = n \times \frac{R}{N} - k + \frac{1}{2},$$

and stopping counting of the counter while incrementing a value of k by 1 within each second pulse interval whenever a value of Bias' is greater than or equal to 0.

11. A non-volatile storage medium, having computer-readable instructions stored therein, wherein the computer-readable instructions executable by one or more processors are configured to implement the following steps:
dividing oscillation periods of a second pulse signal of a crystal oscillator clock of a Field Programmable Gate Array (FPGA) board by a number of equally divided sampling pulses and obtaining a remainder thereof;
dividing the remainder by the number of the equally divided sampling pulses to serve as an error within each sampling interval; and
using a counter to count from the second pulse signal and stopping counting of the counter whenever the error within the sampling interval, which is accumulated within a second pulse interval, is greater than or equal to the oscillation period.

12. The non-volatile storage medium according to claim 11, wherein the computer-readable instructions executable by one or more processors are configured to implement the following steps:
dividing the oscillation periods of the second pulse signal of the crystal oscillator clock of the FPGA board by the number of the equally divided sampling pulses to obtain a quotient thereof; and
generating a sampling pulse within each second pulse interval in response to a value of the counter reaching the quotient while the counter is reset and restarts counting.

13. The non-volatile storage medium according to claim 12, wherein the computer-readable instructions executable by one or more processors are configured to implement the following steps:
performing correction according to a correction formula $$\text{Bias} = n \times \frac{R}{N} - m$$

and stopping counting of the counter within each second pulse interval whenever a value of Bias is greater than or equal to 1, wherein:

$$\frac{R}{N}$$

represents an error within each sampling interval, R is the remainder, and N is the number of the equally divided sampling pulses;
n represents a number of sampling pulses and is reset at a next second pulse; and
m represents a number of counting stops of the counter within each second pulse interval, a starting value of m is 0, and a value of m is reset at a next second pulse.

14. The non-volatile storage medium according to claim 13, wherein the computer-readable instructions executable by one or more processors are configured to implement the following steps:
performing correction according to a second correction formula $$\text{Bias} = n \times \frac{R}{N} - m + \frac{1}{2}$$

and stopping counting of the counter within each second pulse interval whenever the value of Bias is greater than or equal to 1.

15. The non-volatile storage medium according to claim 14, wherein the computer-readable instructions executable by one or more processors are configured to implement the following steps:
performing correction according to a third correction formula $$\text{Bias}' = n \times \frac{R}{N} - (m+1) + \frac{1}{2} = n \times \frac{R}{N} - k + \frac{1}{2}$$

and stopping counting of the counter while incrementing a value of k by 1 within each second pulse interval whenever a value of Bias' is greater than or equal to 0.

* * * * *